Aug. 16, 1938.　　　　F. J. TOPPING　　　　2,127,073

AIR-COOLED STEAM PIPE EXPANSION JOINT

Filed June 10, 1937

Inventor

F. J. Topping

By C. A. Snow & Co.

Attorneys.

Patented Aug. 16, 1938

2,127,073

UNITED STATES PATENT OFFICE 2,127,073

AIR-COOLED STEAM PIPE EXPANSION JOINT

Frank J. Topping, Hinton, W. Va.

Application June 10, 1937, Serial No. 147,571

4 Claims. (Cl. 285—162)

This invention relates to steam pipe couplings, the primary object of the invention being to provide a steam pipe coupling wherein the packing thereof will be insulated against the intense heat of the locomotive or boiler with which the coupling is used, thereby prolonging the life of the packing material to the maximum.

Another object of the invention is to provide a steam pipe coupling so constructed that an air passageway is provided to insure a circulation of air around the coupling between the packing material and inner surface of the coupling, whereby the packing material is maintained cool, preventing burning of the packing material which usually renders the packing material hard and impervious to lubricating material.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing.

Figure 1:
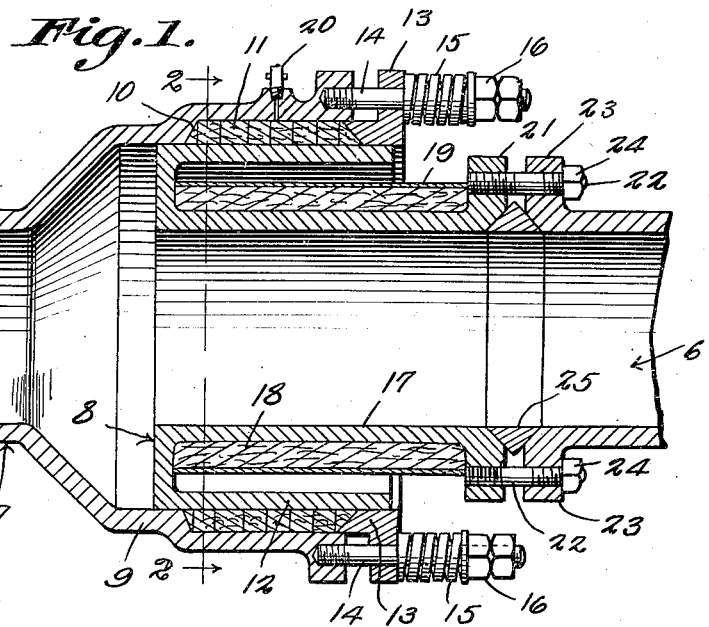
Figure 1 is a longitudinal sectional view through a steam pipe coupling constructed in accordance with the invention.
Figure 2:
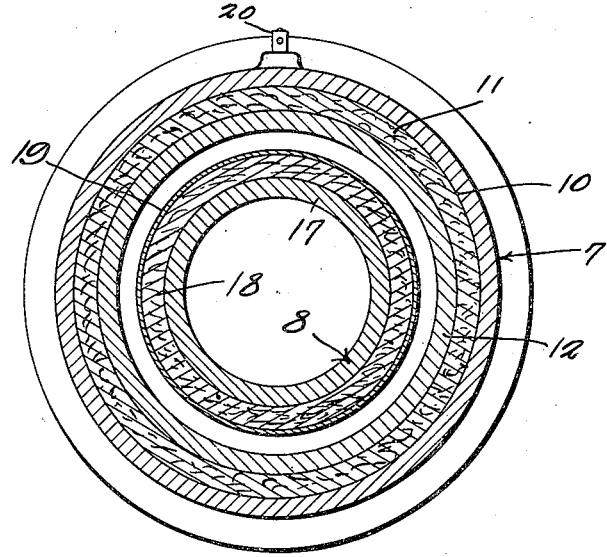
Figure 2 is a sectional view taken on line 2—2 of Figure 1, of the drawing.

Referring to the drawing in detail, the reference characters 5 and 6 designate the adjacent ends of steam pipe sections, connected by the coupling forming the subject matter of the present invention.

The coupling includes an outer section 7 and an inner section 8, the section 7 being provided with a flared or enlarged portion 9 into which the inner section 8 of the coupling extends, as clearly shown by Figure 1 of the drawing.

A recessed portion 10 is formed in the outer section, and accommodates the packing material indicated by the reference character 11, the packing material contacting with the outer wall 12 of the inner coupling section 8, providing a steam-tight connection between the outer and inner sections of the coupling. The packing gland, which engages the packing material to hold the packing material in place, is indicated by the reference character 13, the packing gland being formed with openings through which the bolts 14 extend, the bolts being supplied with coiled springs 15 that exert a pressure on the packing gland to force the gland into the recessed portion, against the packing material. Nuts indicated by the reference character 16 are positioned on the threaded outer ends of the bolts 14 so that the tension of the springs may be regulated.

As clearly shown by Figure 1 of the drawing, the inner wall 17 of the inner coupling section, is spaced from the outer wall 12 thereof, providing an annular space between the main portion of the inner coupling section and the outer wall 12 thereof, to the end that air will circulate through the annular passageway counteracting the intense heat of the coupling, caused by the passage of steam therethrough, thereby protecting the packing material against the heat and prolonging the life of the packing material which usually becomes hard and impervious to lubricating material, due to the intense heat.

Lagging material indicated by the reference character 18 is positioned around the inner wall of the inner coupling section, and is held in position by means of the jacket 19, to further insulate the packing material against the heat of the steam passing through the coupling.

The reference character 20 designates a pipe through which lubricating material may be directed to the packing material to maintain the packing material pliable.

Flanges 21 are provided at the ends of the coupling, and are formed with threaded openings to receive the threaded ends of the bolts 22 which also pass through openings of the flanges 23 of the pipe sections 5 and 6. Nuts indicated by the reference character 24 are positioned on the bolts 22, and secure the flanges of the pipes 5 and 6, into close engagement with the gasket 25 held between the adjacent ends of the pipe sections 5 and 6, and the coupling.

From the foregoing it will be seen that due to the construction shown and described, an annular space or passageway is provided between the inner wall 17 of the inner coupling section and the outer wall 12 thereof, to the end that air may circulate between the outer and inner walls of the inner coupling section, cooling the inner coupling and reducing heat to a minimum.

I claim:

1. A pipe coupling for connecting the ends of steam pipes, comprising cooperating inner and outer sections secured to adjacent ends of steam pipes, packing material disposed between the sections providing a steam-tight connection, said inner section embodying spaced inner and outer walls, a jacketing member secured around the inner wall of the inner section and spaced from the outer wall of the inner section, providing an air chamber, insulating the packing material against the heat of the steam passing through the pipe coupling.

2. A pipe coupling comprising an outer section and an inner section fitted within the outer section, packing material between the sections providing a steam-tight connection between the sections, said inner section comprising spaced walls providing an air circulating passageway between the inner wall and packing material, maintaining the packing material cool.

3. A pipe coupling comprising an outer section and an inner section fitted in the outer section, packing material between the sections, said inner section including spaced inner and outer walls, lagging encasing the inner wall and spaced from the outer wall providing an annular air circulating passageway between the inner and outer wall of the inner section.

4. A pipe coupling comprising an outer section and an inner section between which packing material is held, spaced inner and outer walls forming the inner section and providing an air circulating space between the inner and outer walls of the inner section, maintaining the packing material cool.

FRANK J. TOPPING.